United States Patent [19]
Ushikoshi et al.

[11] Patent Number: 5,794,838
[45] Date of Patent: Aug. 18, 1998

[54] CERAMICS JOINED BODY AND METHOD OF JOINING CERAMICS

[75] Inventors: Ryusuke Ushikoshi, Tajimi; Hideyoshi Tsuruta; Tomoyuki Fujii, both of Nagoya, all of Japan

[73] Assignee: NGK Insulators, Ltd., Japan

[21] Appl. No.: 679,286

[22] Filed: Jul. 12, 1996

[30] Foreign Application Priority Data

Jul. 14, 1995 [JP] Japan ................. 7-200227

[51] Int. Cl.$^6$ .................. B23K 31/02; B23K 103/16
[52] U.S. Cl. ..................... 228/121; 228/122.1
[58] Field of Search ............... 228/121, 122.1, 228/124.1, 124.6

[56] References Cited

U.S. PATENT DOCUMENTS

| | | | |
|---|---|---|---|
| 3,979,187 | 9/1976 | Scherer | 228/124.6 |
| 4,596,354 | 6/1986 | Moorhead | 228/122 |
| 4,602,731 | 7/1986 | Dockus | 228/121 |

FOREIGN PATENT DOCUMENTS 0 187 025   7/1986   European Pat. Off.

Primary Examiner—Samuel M. Heinrich
Attorney, Agent, or Firm—Parkhurst & Wendel, L.L.P.

[57] ABSTRACT

Novel method of joining ceramics containing aluminum nitride and another member made of a metal or a ceramic is provided having an improved joining strength and a corrosion-resistant property by joining a first member made of a ceramics consisting of an aluminum compound. The second member is made of a ceramics or a metal, forming a metal film directly on a surface to be joined of the first member interposing a metallic joining material which is made of a different material from the metal film. The metallic joining material is between the metal film and the second member, and by heating at least the metallic joining material and the metal film in such an interposed state to form a joining layer made of the metallic joining material and an intermetallic compound between the first and second members, so as to join the two members.

4 Claims, 10 Drawing Sheets

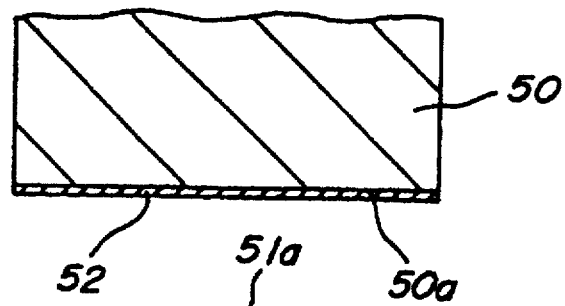
FIG._1A
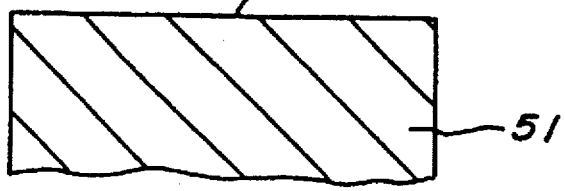
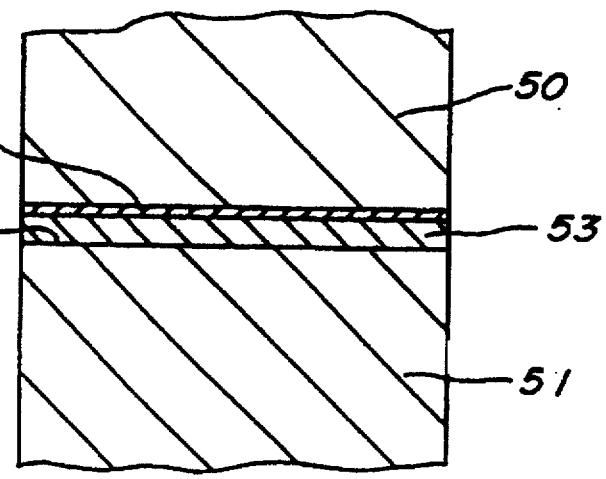
FIG._1B
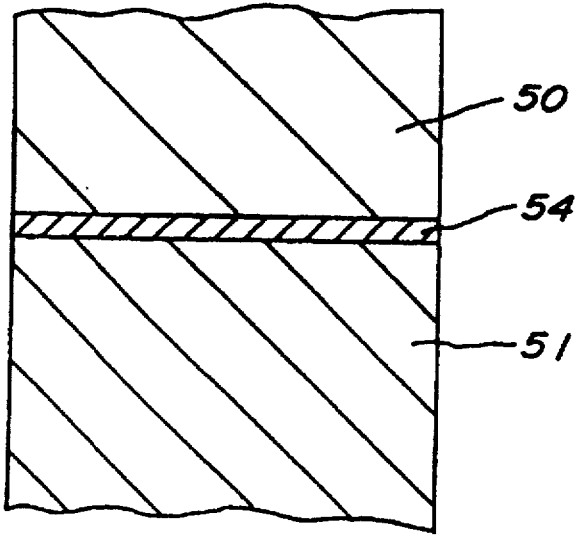
FIG._1C

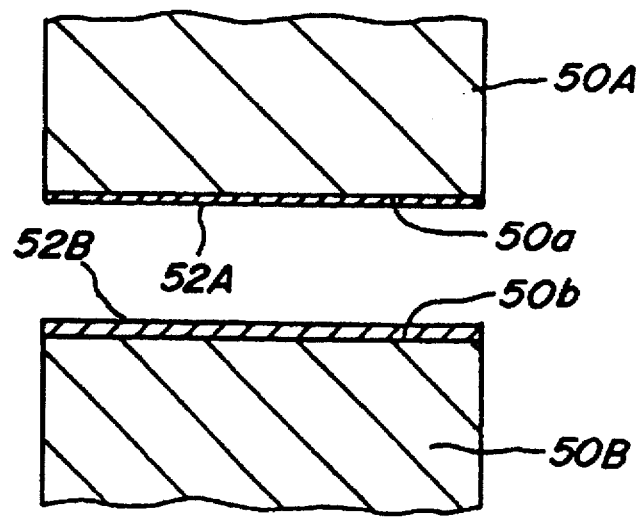
FIG._2A
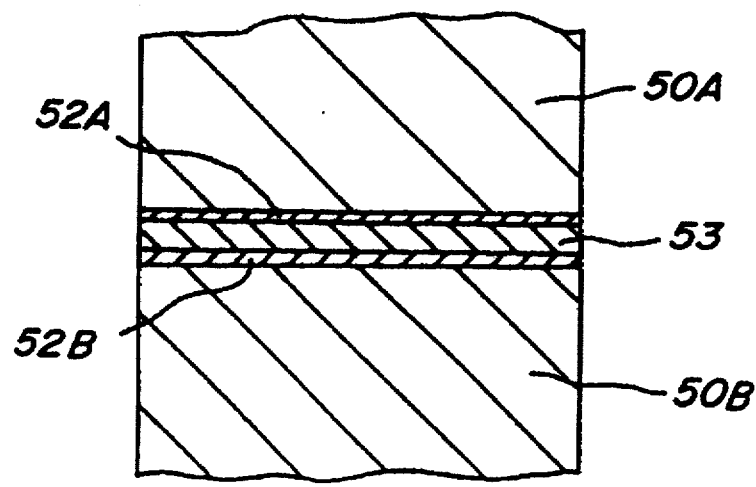
FIG._2B
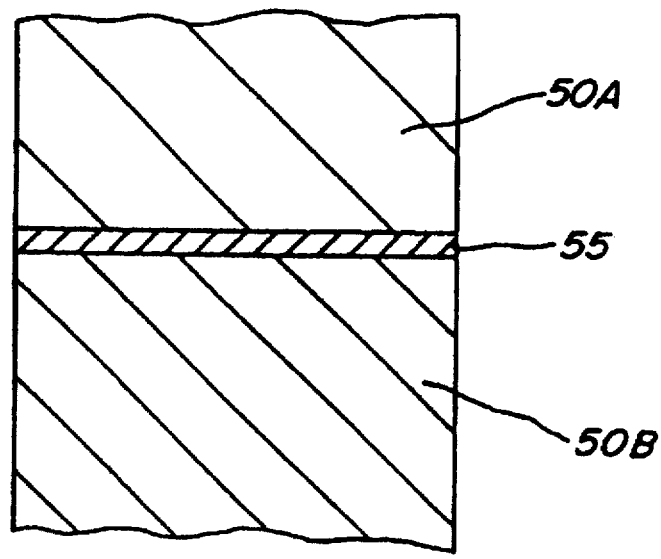
FIG._2C

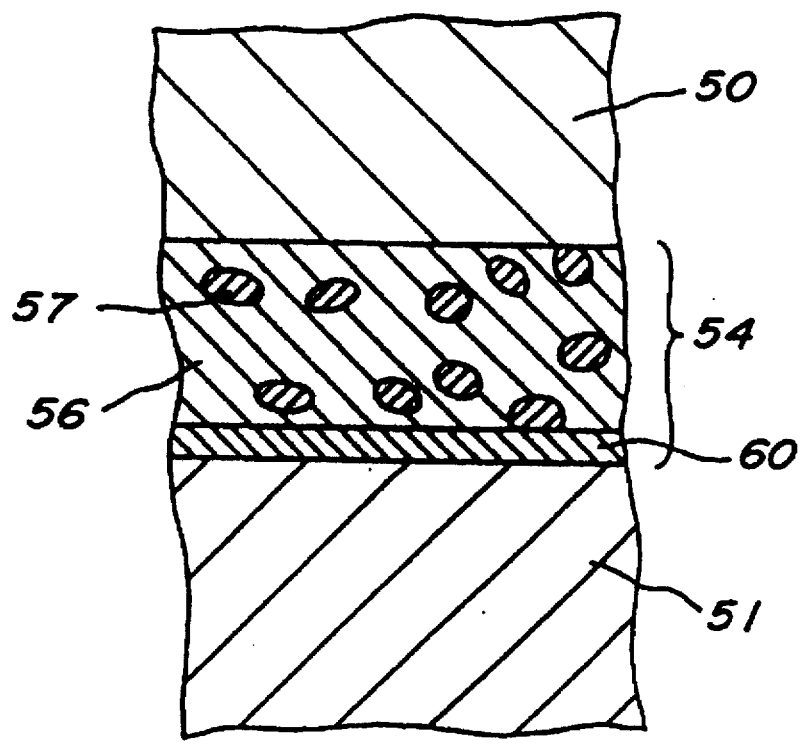
FIG_3A
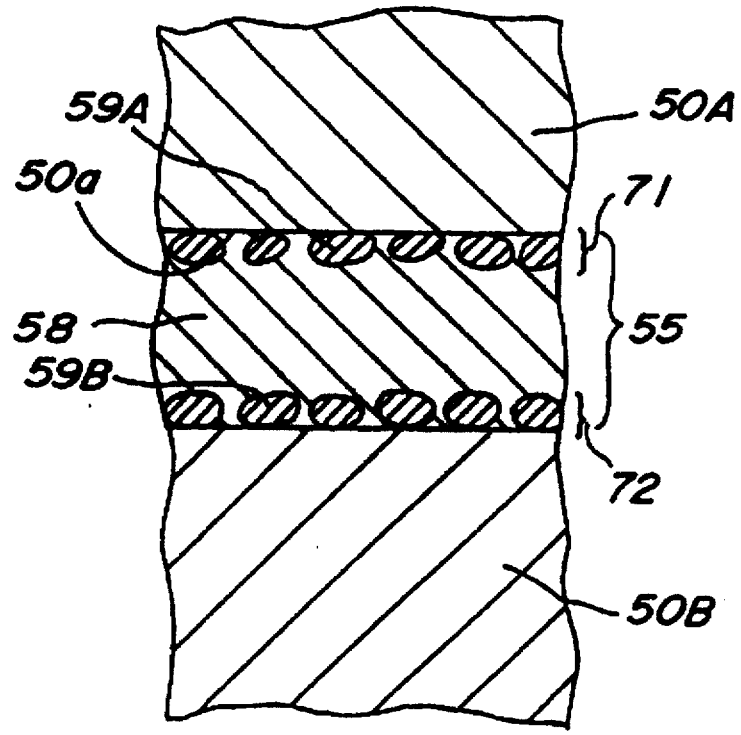
FIG_3B

FIG_9
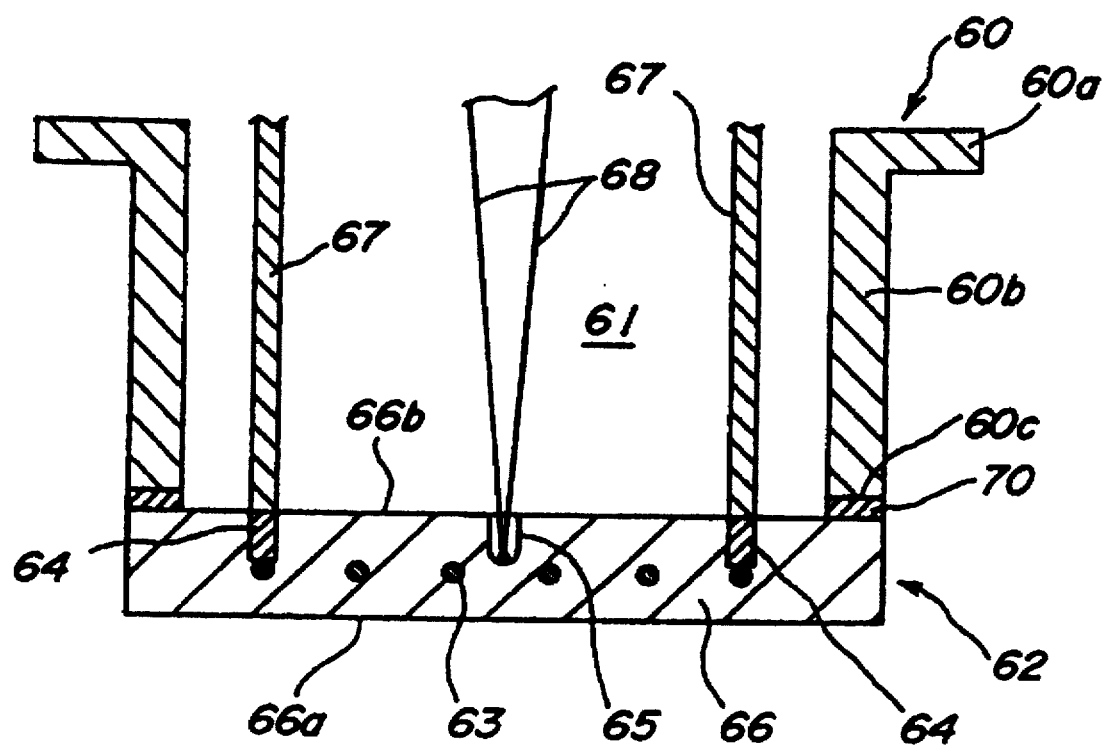

AlN-AlN Joined Body

AlN-Ni Joined Body

CERAMICS JOINED BODY AND METHOD OF JOINING CERAMICS

BACKGROUND OF THE INVENTION

1. Field of the Invention

The present invention relates to a ceramics joined body, particularly a joined body of a ceramic member made of an aluminum compound and another member made of a metal or a ceramics, and a method of joining the two members.

2. Related Art Statement

Heretofore, various methods of joining a ceramic member and a metal member with the aid of a brazing material have been provided for various uses. Particularly, for joining an alumina or aluminum nitride member to another member, the following methods are known.

(1) An active brazing metal is used for the joining.

(2) A paste of molybdenum-manganese is applied on a surface of aluminum nitride, and baked to form a baked layer, a nickel plating is provided on the baked layer, and brazing is effected on the nickel plating via an intervening brazing material.

However, in the above methods (1) and (2), an active metal, such as titanium or molybdenum, etc., remains in the joined portion. Thus, particularly when a plasma of a halogen series corrosive gas exists, an active metal, such as Ti or Zn, etc., existing in the joining portion or Mn, Mo or glass, etc., is likely corroded easily. In addition, when an active brazing metal is directly contacted with a surface of a ceramic member and melted in the method (1), wettability of alumina or aluminum nitride is often bad, so that there is still room left for improving in order to stably obtain a high joining strength.

The method (2) is for solving the problem of wettability of the brazing material to ceramics, and includes the steps of applying a paste containing a respective powder of molybdenum, manganese and glass on a surface of the ceramic member, and baking the paste thereon. At that time, the components of the glass are solidified on the surface of the ceramic member to form a glass layer, while a molybdenum-manganese layer is formed on the glass layer. In such a case, joining strength of the ceramic member and the glass layer is relatively high, and the molybdenum-manganese layer and the brazing metal are strongly bonded. In this way, since a direct strong bonding of a brazing metal on a surface of a ceramic member is difficult, a glass layer and a molybdenum-manganese layer are interposed therebetween to improve the joining strength therebetween. However, the layers intervening between the ceramic member and the another member were so many that the strength of the joining portion was not always stable. Moreover, in order to bake and fix such a glass-containing paste on the surface of the ceramic member, a high temperature of at least 800° C. is usually necessary, so that a residual stress resulting from difference between thermal expansions of the ceramic member and the metal member becomes large to likely a cause a destruction.

SUMMARY OF THE INVENTION

An objection of the present invention is to provide a novel method of joining a ceramic member containing aluminum and another member made of a metal or a ceramic.

Another object of the present invention is to improve the joining strength of the joined body.

A further object of the present invention is to provide a micro structure of the joined body having a high strength at the joined interface.

The present invention is a ceramics joined body including a ceramic first member made of an aluminum compound and a second member made of a ceramics or a metal, comprising a joining layer formed between the first member and the second member, and the joining layer having a continuous phase made of a metallic joining material and a dispersed phase made of an intermetallic compound formed among the continuous-phase.

The present invention is also a method of joining a ceramics including joining a ceramic first member made of an aluminum compound and a second member made of a ceramics or a metal forming a metal film on a surface to be joined of the first member such that the metal film contacts directly with the surface to be joined of the first member, interposing a metallic joining material made of a different material from the metal film between the metal film and the second member, and heating at least the metallic joining material and the metal film in the state that the metallic joining material intervenes between the metal film and the second material thereby to join the first member and the second member.

The inventors made studies in order to develop a method of firmly joining a ceramic member, such as aluminum nitride, etc., to another member at a lowest temperature as possible. In the process of the study, the inventors made tests of forming a nickel plating layer or a vapor deposited nickel layer on the surface of the ceramic member. In that step, the vapor deposited nickel layer or the nickel plating layer had a weak joining strength to the ceramic member and easily peeled off therefrom. However, the inventors have found out that if a brazing material was provided directly on the surface of the nickel plating layer or the vapor deposited nickel layer, and the brazing material was contacted to another metal or ceramic member and heat-treated under the contacted state, an unexpected firm joining can be attained between the ceramic member and the another member.

The thus obtained joined body was analyzed by inspecting the state of the joined interface thereof to find out that the vapor deposited nickel layer or the nickel plating layer was disappeared and nickel was reacted with the brazing material to form a dispersed layer made of an intermetallic compound. From this finding, the mechanism of joining was presumed as follows. In the process of heating the brazing material, at first the brazing aluminum is wetted by nickel, and then nickel is melted in the brazing material to form an intermetallic compound between nickel and aluminum. The reaction of forming the intermetallic compound between nickel and aluminum is an exothermic reaction, it is considered that a local temperature elevation occurred by the reaction heat, so that aluminum and aluminum nitride are wetted to afford the joining.

This point will further be explained. When a metal film made of nickel and a metallic joining material consisting mainly of aluminum are used for the joining, they are usually heated to 600° C. It is forecasted that at that time an aluminum-nickel intermetallic compound is formed under an exothermic reaction, so that local temperature elevations occur. Generally, ceramics and metals have improved wettability at high temperatures. Therefore it is considered that also this case, the wettabilities of the ceramics and the metal are improved by virtue of the exothermic reaction to afford the firm joining.

The thus obtained joined body according to the present invention includes a continuous layer made of a metallic joining material and a dispersed layer made of an intermetallic compound finely dispersed in the continuous layer.

Usually, an intermetallic compound has a coefficient of thermal expansion which is smaller than that of a main component of the metallic joining material, and which is close to those of ceramics, particularly to those of nitride ceramics. By adopting the structure wherein such a dispersed layer is dispersed in the continuous layer of the metallic joining material, the residual stress after the joining could particularly be noticeably mitigated.

Particularly when the joined body of the present invention is used to use fields of being exposed to a halogen series corrosive gas, such as $NF_3$ or $CF_4$, etc., permeation of the corrosive gas into the inside of the joining layer can be blocked at the place of the dispersed layer made of the intermetallic compound to prevent the invasion of corrosion. Therefore, the present invention is most suited to this use.

The inventors have found out that although the aforedescribed joining is most useful in joining an aluminumnitride member to the another ceramic or metal member, it is also applicable in the case of joining an alumina member to another member.

As the material of the metallic joining member, use is made of a metallic brazing material. The metallic joining material may have any shape of sheet, powder or a mixed paste of powder and a binder. The above described expression "forming a metal film on a surface to be joined of the first member such that the metal film contacts directly with the surface to be joined of the first member" means that the metal film and the ceramic first member are joined without an intervening substance therebetween. If another substance is intervening between the metal film and the ceramic first member, a joining strength of the metallic joining material to the first member cannot be improved.

The clarify the above statement, the metal film can be formed on a surface of the first member by gas phase processes (chemical vapor deposition process, sputtering process, etc.), liquid phase processes (electrolytic plating process, electroless plating process, etc.). Particularly, according to the electroless plating process, the surface of the ceramic first member can easily be coated with the metal film. The metal layer preferably has a thickness of 0.1–20 µm.

A paste obtained by dispersing a powder of Ni or the like in an organic binder may be applied to a surface of the first member, the applied paste may be dried to dissipate the organic binder thereby to form the metal film. Alternatively, a metal foil may be contacted to a surface of the first member to form the metal film.

Among these methods, if the metal film was provided according to the gas phase processes, the liquid phase processes, or the paste-drying method, a satisfactory metal film could be obtained particularly with regard to the joining strength and the residual stress.

Next, in the state of the metallic joining material intervening between the metal film and the second member, heating is effected to heat at least the metallic joining material and the metal film. At the time of heating, preferably the metallic joining material is melted to perform the brazing. However, the whole of the metallic joining material needs not always be melted, and local melting of a portion thereof at least in the neighborhood of the interface between the metal film and the metallic joining material is sufficient. The expression "heating at least the metallic joining material and the metal film" comprises, in addition to the heat treating of all the joined body including these and the first and second members, the case of heat treating exclusively the regions having the metal film and the metallic joining material by a local heating means, such as, high frequency wave, laser beam, etc.

As the material of the metal film to be applied on the surface of the ceramic first member, use may be made of copper or aluminum, in addition to nickel.

BRIEF DESCRIPTION OF THE DRAWING

For a better understanding of the present invention, reference is made to the accompanying drawings, in which:

FIG. 1A is a schematic cross-sectional view showing a state of forming a metal film 52 on a surface 50a of a first member 50;

FIG. 1B is a schematic cross-sectional view showing a state of opposing and laminating the first member 50 and the second member 51;

FIG. 1c is a schematic cross-sectional view of a joined body obtained by joining the first and second members 50, 51;

FIG. 2A is a schematic cross-sectional view showing a state of forming metal films on the respective surface of the first and second members 50A, 50B;

FIG. 2B is a schematic cross-sectional view of the opposingly laminated first and second members 50A, 50B;

FIG. 2C is a schematic cross-sectional view of a joined body obtained by joining the first and second members 50A, 50B;

FIG. 3A is a schematic enlarged cross-sectional view of a joined interface of the first and second members 50, 51;

FIG. 3B is a schematic enlarged cross-sectional view of a joined interface of the first and second members 50A, 50B;

FIG. 9 is a schematic cross-sectional view showing a state of integrally joining a ceramic heater 62 to a flange portion 60 of a semiconductor producing apparatus;

Figure 4A:
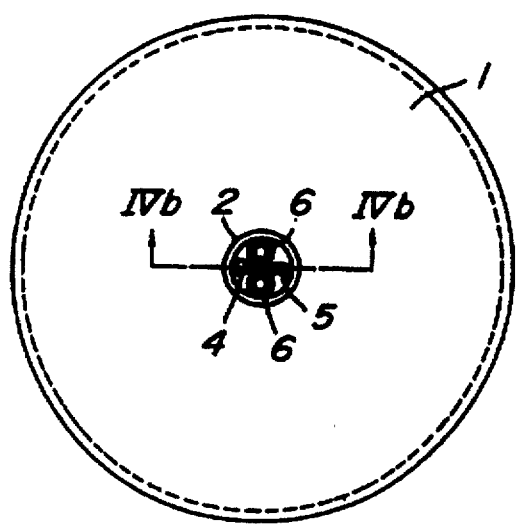
FIG. 4A is a plan view of an example of a plasmagenerating electrodes apparatus accommodating therein high frequency electrodes showing an example of using the ceramics joining structure of the present invention.

Numbering in the drawings
1 . . . substrate
11 . . . hub
12 . . . mesh electrode
14 . . . electric power supplying member
15, 20 . . . joining layer
16, 21 . . . inserting member
19 . . . cap
44 . . . terminal of electric power supplying member
45 . . . electric power supplying member
50, 50A . . . ceramic first member made of an aluminum compound
50a . . . surface of the first member
50B, 51 . . . second member
52, 52A, 52B . . . metal film
53 . . . metallic joining material
54, 55 . . . joining layer
56, 58 . . . metallic joining material
57, 59A, 59B . . . dispersed phase made of intermetallic compound
60 . . . continuous phase made of intermetallic compound
71, 72 . . . region rich with intermetallic compound Hereinafter, the present invention will be explained in more detailed with reference to the exemplified drawings.

Referring to FIGS. 1A–1C showing the processes of joining the first member 50 and the second member 51, the whole shapes of the members 50, 51 are not specifically limited. The first member 50 is a ceramics made of aluminum compound, and the second member 51 is made of a metal or ceramics other than the aluminum compound. As such a ceramics, aluminum nitride may be exemplified, and as such a metal, nickel, cooper, aluminum, and Kovar may be exemplified. A metal film 52 is formed on a surface 50a to be joined of the first member 50, as shown in FIG. 1A. Then, the first member 50 and the second member 51 are opposed with a metallic joining material 53 intervening between the metal film 52 of the first member 50 and the surface 51a to be joined of the second member 51, as shown in FIG. 1B. Thereafter, the first and second members 50, 51 are heat-treated to join the members 50, 51 with a joining layer 54 formed therebetween, as shown in FIG. 1C.

FIGS. 2A–2C are schematic cross-sectional views showing the processes of joining the first member 50A and the second member 50B. The first and second members 50A, 50B are ceramics respectively made of an aluminum compound. For that reason, a metal film 52A is formed on a surface 50a to be joined of the first member 50A, while a metal film 52B is formed on a surface 50b to be joined of the second member 50B, as shown in FIG. 2A. Then, the first and second members 50A, 50B are opposed with a metallic joining material 53 intervening between the metal films 52A, 52B, as shown in FIG. 2B. Thereafter, the first and second members 50A, 50B are heat treated to join the members 50A, 50B with a joining layer 55 formed therebetween, as shown in FIG. 2C.

As explained above with reference to FIGS. 1A–1C, if the second member made of a metal or ceramics other than the ceramics made of the aluminum compound is joined to the first member, the joining layer 54 is formed as shown in schematic cross-sectional view in FIG. 3A. The metal film 52 shown in FIG. 1A is disappeared in the joining layer 54, and particles 57 made of an intermetallic compound or a dispersed layer thereof were dispersed in the continuous layer 56 made of the metallic joining material. Namely, accompanying with the proceeding of the reaction of the metallic joining material with the material of the metal film, the components of the metal film were removed into the metallic joining material. In addition, particularly, a continuous layer 60 made of the intermetallic compound was occasionally formed on the surface of the second member 51 made of a metal. The continuous layer 60 occurred easily particularly when the second member was made of nickel. The continuous phase 60 is composed of a plural layers of intermetallic compounds of different composition or a single composition.

On the other hand, as explained above with reference to FIGS. 2A–2C, if the first and second members 50A, 50B both made of aluminum compounds are joined, the joining layer 55 is formed as shown in schematic cross-sectional view in FIG. 3B. That is, the metal films 52A, 52B shown in FIG. 2A are disappeared in the joining layer 55, and particles 59A, 59B made of intermetallic compounds, were formed along the surfaces 50a, 50a of the members 50A, 50B. This is considered due to starting of the solidification of the joining layer 55 from the vicinity of the respective surfaces 50a, 50a. The respective particles 59A, 59B were existing continuously along the respective interface to form regions 71, 72 which are rich with the intermetallic compound.

Next, preferable metallic joining materials which can be used in the present invention will be explained. The metallic joining material is not particularly limited to specific ones so far as it can form an intermetallic compound between the material of the metal film, and pure metals of copper, nickel, silver, aluminum or alloys thereof may be used. In order to reduce at the maximum the residual stress between the first member and the second member, a brazing material consisting mainly of aluminum is preferable, because it can perform the joining at low temperatures. In the present invention, a firm joining could be formed without particularly incorporating an active metal into the metallic joining material. This indicates that diffusion of active metal components into the ceramic members are not particularly necessary.

Therefore, an active metal needs not be incorporated into the brazing aluminum, however, 0.3–20 wt. % of Mg may be incorporated therein. Also, a third component of an amount of not more than 50 wt. % may be incorporated into the brazing aluminum. As the third component, at least one component selected from the group consisting Si and Cu may be used.

From a view point of durability to halogen series corrosive gases, metallic joining materials consisting mainly either of nickel, copper and aluminum are preferable. If Si is used as a component of the alloys, the amount of Si is desirably not more than 20 wt. % so as not to suffer from corrosive gases.

Figure 4B:
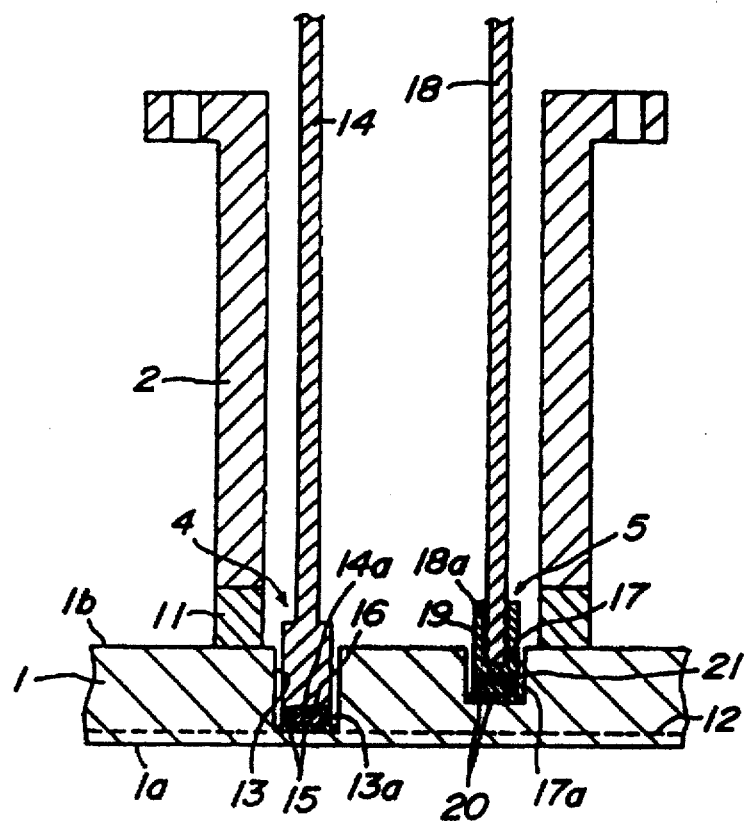
FIG. 4B is a schematic cross-sectional view showing a joining portion of electric power supplying member in the plasma-generating apparatus shown in FIG. 4A.

Hereinafter, preferable embodiments of various changes of the shapes of the first and second members will be explained in sequence. Referring to FIG. 4A showing an example of the structure of susceptor having high frequency electrodes and FIG. 4B showing a cross-sectional view of the susceptor of FIG. 4A along the line IVb—IVb, a high frequency electrode 12 is embedded in a disc-shaped substrate 1 which is a ceramics made of an aluminum compound. The high frequency electrode 12 is a mesh-shaped bulk material in this example. Reference numeral 2 is a flange made of alumina for attaching the substrate 1, reference numeral 4 is a joining portion of the electric power supplying member, reference numeral 5 is a joining portion of a thermocouple, and reference numeral 6 is a supporting portion for the substrate 1 of the susceptor and the alumina flange 2. Among these, detailed structure of the joining portion 4 of the electric power supplying member and the joining portion 5 of the thermocouple are shown in FIG. 4B.

The flange 2 is joined to a hub 11 made of aluminum nitride, and the hub 11 is joined to the rear surface 1b of the substrate 1. A high frequency electrode 12 is embedded in the substrate 1 at the vicinity of the surface 1a. The high frequency electrode 12 is preferably made of a high melting point metal, such as molybdenum, tungsten, etc. The substrate 1 is formed of a hole 13 opening at the rear surface 1b and exposing a mesh electrode 12 at the bottom. An elongated electric power supplying member 14 is accommodated within the inner space of the flange 2, and a distal end portion 14a of the member 14 is joined to the bottom 13a of the hole 13 via a joining layer 15 and an inserting member 16 for mitigating the residual stress. This constitutes the joining portion 4.

Figure 5:
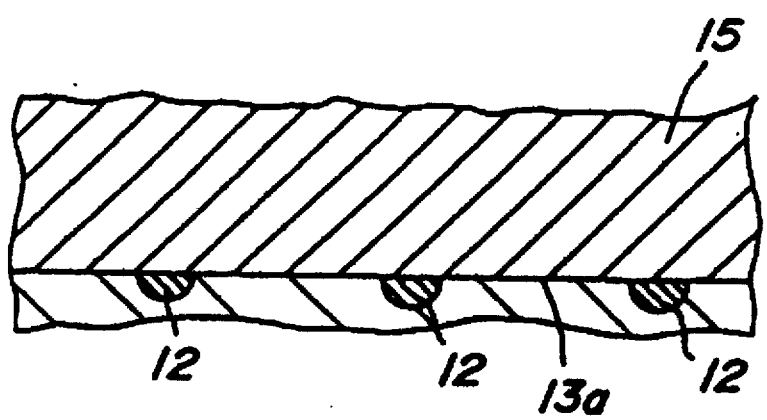
FIG. 5 is a schematic enlarged cross-sectional view showing the neighborhood of the interface between a mesh electrode 12 and a joining layer 15 shown in FIG. 4B.

In the joining portion 4 for the electrode, the joining layer 15 is contacting with the bottom 13a of the hole 13 of the substrate 1, and the mesh electrode 12 is exposed at the bottom 13a, as exemplarily shown in FIG. 5. The joining portion 15 is joined to the mesh electrode 12 which is a metal exposed portion, and the joining portion 15 is joined to the substrate 1. If a mesh electrode 12 is particularly used as the metal exposed portion, the joining portion of the joining portion 15 and the mesh electrode 12 is existing in a mesh fashion, and the joining portion of the joining portion 15 and the substrate 1 is formed at the mesh. In this way, the joining portions of the mesh electrode and the brazing material and the joining portion of the substrate and the brazing material are existing alternately, so that a very strong joining can be achieved.

The substrate 1 has a hole 17 opening at the rear surface 1b. The hole 17 is shallower than the hole 13 and exposing the ceramics of the substrate 1 at the bottom. A hollow sheath 18 covering a thermocouple is accommodated within the flange 2, and a cap 19 of a high melting point metal for protecting the thermocouple is applied around a distal end 18a of the hollow sheath 18. The outer diameter of the cap 19 is slightly smaller than the inner diameter of the hole 17. The joining portion 5 of the thermocouple is constructed by joining the cap 19 to the bottom 17a of the hole 17 via the joining portion 20 and an inserting member 21.

Here, the present invention is applicable to joining of the alumina flange 2 and the aluminum nitride hub 11, and to joining of the hub 11 and the aluminum nitride substrate 1. In such cases, either one may be used as the first member and the other one may be used as the second member. The present invention is also applicable to the joining portion of the inserting member 16 and the substrate 1. In such a case, the substrate 1 exposing to the hole 13 is used as the first member, and the inserting member 16 is used as the second member.

FIG. 6A, 6B, 6C, 7A, 7B, 8A and 8B are respectively a schematic cross-sectional view showing the vicinity of an electric power supplying member in a plasma-generating electrode apparatus which is similar to the example shown in FIGS. 4A, 4B. Similar members as those shown in FIGS. 4A, 4B are allotted with same reference numerals and explanations thereof will be omitted sometimes.

Figure 6A:
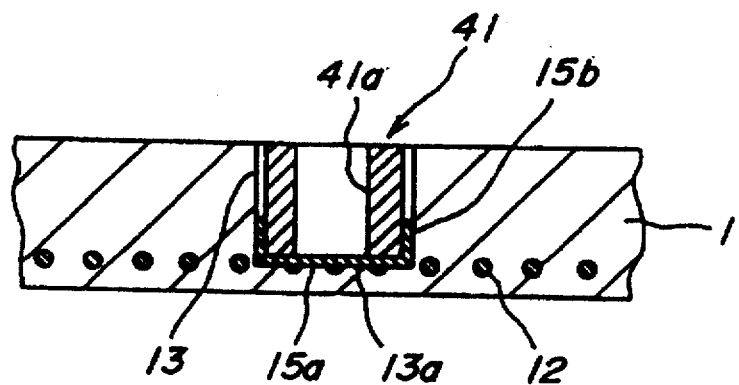
FIGS. 6A, 6B and 6C are schematic cross-sectional views respectively showing an embodiment of applying the present joining method and joined body to the joining portion of the mesh electrode and the electric power supplying member of the plasma-generating electrodes apparatus.

In the example shown in FIG. 6A, a tubular terminal 41 having a through hole 41 at the center is accommodated in the hole 13. The terminal 41 is made of Ni or Al. The lower end surface of the terminal 41 is joined to the bottom 13a by the joining layer 15a, and the lower circumferential side surface of the terminal 41 is joined to the circumferential side surface of the hole 13 by the joining layer 15b. The joining layer 15b functions to prevent direct contact of the corrosive gas in the semiconductor producing apparatus to the mesh electrode 12.

Figure 6B:
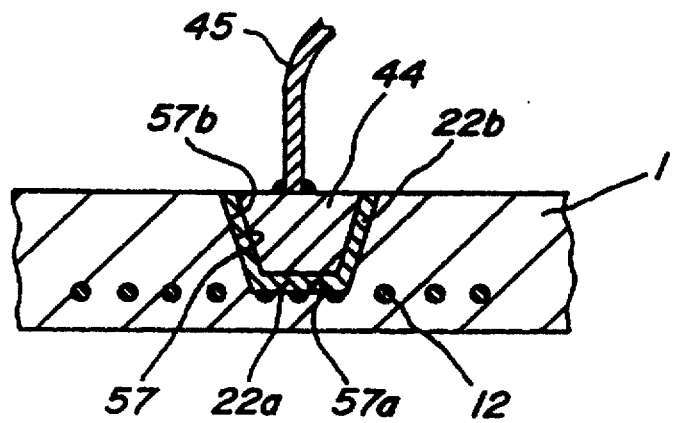

In the example shown in FIG. 6B, a hole 57 is tapered and accommodates a tapered terminal 44 made of Ni or Al therein. The lower bottom surface of the terminal 44 and the bottom 57a of the hole 57 are joined via a joining layer 22a, and the circumferential side surface of the terminal 44 and the circumferential side surface 57b of the hole 57 are joined via a joining layer 22b. Thereafter, an electric power supplying member 45 made of Ni or Al is connected to the terminal 44 by melding.

In the example shown in FIG. 6B, by tapering the hole 57 and joining the circumferential side surface 57b of the hole 57 and the terminal 44 according to the present invention, a larger joining surface bay be obtained and a more gas tight structure for the bottom 57a can be obtained. In addition, by inserting the terminal 44 in the hole 57, the heating of the metallic joining material can be allowed, while pressing the circumferential side surface of the hole 57 along the tapered surface of the terminal 44.

Figure 6C:
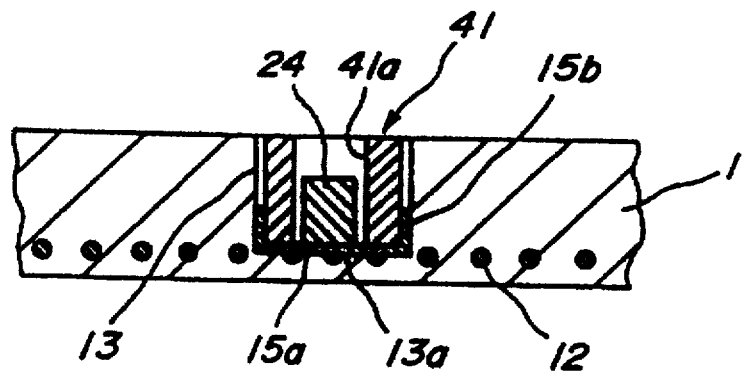

The joining structure shown in FIG. 6C has further a stress-mitigating member 24 made of aluminum nitride and accommodated in the through hole 41a in addition to the joining structure shown in FIG. 6A. The lower bottom surface of the stress-mitigating member 24 and the bottom 13a of the hole 13 are joined according to the present invention. Namely, the joining portion and its neighboring portion are exposed to temperature elevation and processing, and in such cases thermal stress is exerted on the joining interface between the joining layers 15a, 15b and the ceramics caused by difference of thermal expansion between the metal and the ceramics. However, by adopting the structure of sandwiching the terminal 41 by means of the stress-mitigating ceramic member 24, the stress acting on the joining layers from the terminal 41 is dispersed and mitigated. The ceramic member 24 is particularly effective in mitigating the stress at the interface between the joining layer 15a and the ceramics. In FIGS. 6A, 6B and 6C, the substrate 1 exposing to the hole 13 is used as the first member, and the terminals 41, 44 made of a corrosion resistant metal to be joined thereto are used as the second member.

Figure 7A:
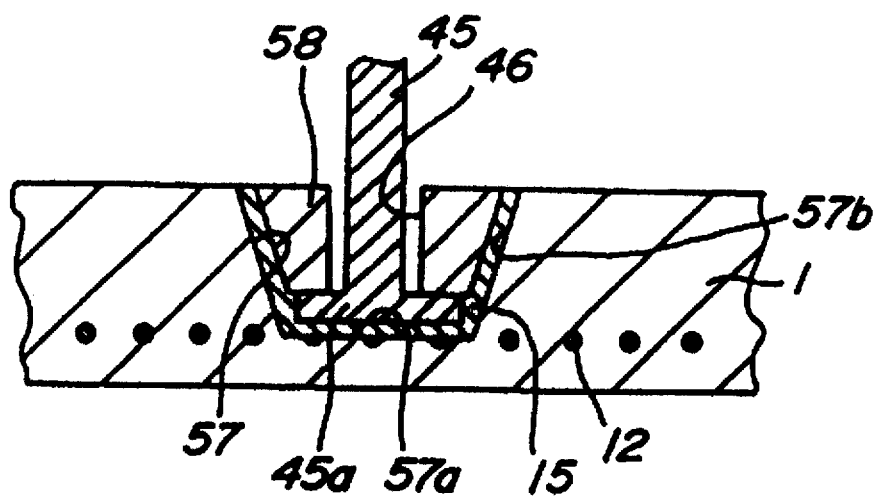
FIGS. 7A, 7B are schematic cross-sectional views respectively showing an embodiment of applying the present joining method and joined body to the joining portion of the mesh electrode and the electric power supplying member of the plasma-generating electrodes apparatus.

In the example shown in FIG. 7A, a through hole 46 is provided at the center of a tapered bush 58. An enlarged pressing portion 45a is formed at the outermost end of the electric power supplying member 45. The member 45 is inserted in the through hole 46 and heating is effected while pushing the metallic joining material toward the direction of the bottom 57a of a hole 57. The heating is also effected while pushing the metallic joining material toward the circumferential side surface 57b of the hole 57 by means of the bush 58.

In this example, when the joining is effected to the bottom 57a of the hole 57, the pressing portion 45a can exert a pressure on the joining portion, so that the joining strength of the joining portion can further be improved along the bottom 57a. In this embodiment, the substrate 1 is used as the first member, and the pressing portion 45a and the corrosion-resistant metallic bush 58 to be joined therewith are used as the second member.

Figure 7B:
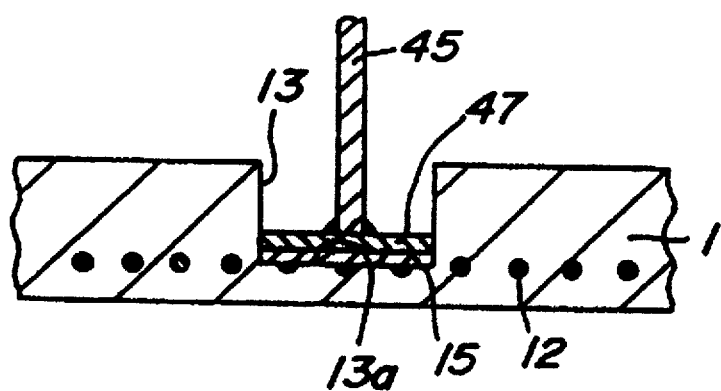

In the example shown in FIG. 7B, a thin disc 47 made of Ni or Al having substantially the same shape and inner diameter with those of the hole 13 is joined to the bottom 13a of the hole 13 via the joining layer 15 according to the present invention. Then, the Ni or Al thin disc 47 is connected to the electric power supplying member 45 made of Ni or Al by welding to make integral therewith. In this embodiment, the thermal stresses generated in the production step and during the use can further be decreased by the use of the disc 47. In this embodiment, the substrate 1 is used as the first member, and the disc 47 to be joined therewith is used as the second member.

Figure 8A:
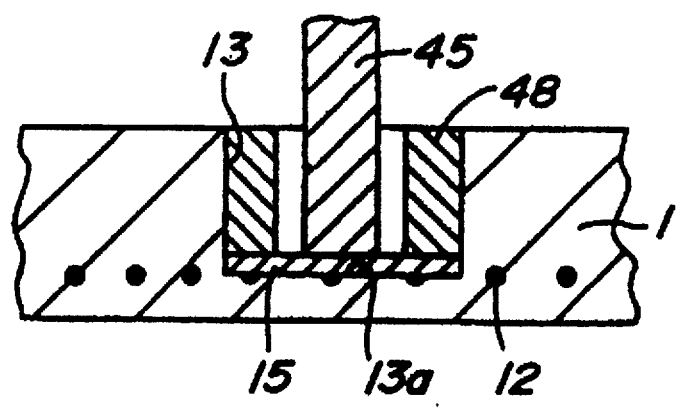
FIGS. 8A, 8B are schematic cross-sectional views respectively showing an embodiment of applying the present joining method and joined body to the joining portion of the mesh electrode and the electric power supplying member of the plasma-generating electrodes apparatus.

In the example shown in FIG. 8A, an end surface of an aluminum nitride ring-shaped intermediate member 48 and an end surface of an electric power supplying member 45 made of Ni or Al is joined in the hole 13 to the bottom 13a via the joining portion 15. In this embodiment, the aluminum nitride intermediate member 48 and the practically electric power supplying member 45 are simultaneously joined to the bottom 13a, so that the thermal stresses can further be decreased. In this embodiment, the substrate 1 is used as the first member, and the electric power supplying member 45 and the intermediate member 48 are used as the second member.

Figure 8B:
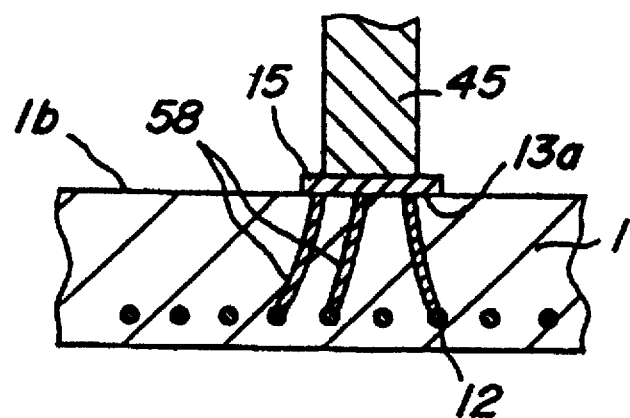

In the example shown in FIG. 8B, several portions of the mesh electrode 12 are severed and the remaining portions of the mesh electrode 12 are extended toward the rear surface 1b of the substrate 1, and the substrate 1 at this state was sintered integrally. By this operation, the severed portions 58 are extending from the mesh electrode 12 toward the direction of the rear surface 1b, and the end surfaces of thin wires 58 which constitute the severed portions are exposed on the rear surface 1b. The electric power supplying member 45 is joined to the rear surface 1b of the substrate 1 via the joining member 15, and the electric power supplying member 45 is connected to the wires 58. In this embodiment, the substrate 1 is used as the first member, and the electric power supplying member 45 is used as the second member. In the embodiment shown in FIG. 8B, the processes of forming the holes 13, 57 are not necessary on the mesh portion 12 which is difficult to process.

FIG. 9 is a schematic cross-sectional view of a structure joining a metal flange 60 and a ceramics heater 62 of a semiconductor producing apparatus. The metal flange 60 is provided with an attaching portion 60a for attaching the flange 60 to the chamber of the semiconductor producing apparatus, and an elongated portion 60b extending in the interior of the apparatus. A space 61 separated from the inner atmosphere of the apparatus is formed within the elongated portion 60b. To an end surface 60c of the elongated portion 60b is joined a rear surface 66b of a ceramics substrate 66 of a ceramic heater 62 via a joining member 70 according to the present invention. A heat-generating resistive member 63 is embedded in the substrate 66 and the ends of the heat-generating resistive member 63 are connected to terminals 64. The terminals 64 are exposed on the rear surface 66b of the substrate 66 and connected respectively to rod members 67 for supplying an electric power. The substrate 66 has a recess 65 at the rear surface 66b, which accommodates therein an end heat contacting portion of a thermocouple 68.

The temperature of a wafer-heating surface 66a is controlled by adjusting the electric power to be supplied to the heat-generating resistive member 63, while measuring the temperature of the substrate 66 by means of the thermocouple 68. The method for measuring the temperatures, the structure of the heat-generating resistive member and the structure of connecting the terminals are of course not specifically limited. By this arrangement, a heating apparatus can be provided which prevent the easily corrodable thermocouple and the terminals of the ceramics heater from exposing to the interior of the semiconductor producing apparatus.

In the example shown in FIG. 9, a functional member, such as an electrostatic chuck electrode or a high frequency electrode can be embedded in the substrate 66 to which the flange 60 is to be joined. At that time, the respective functional member and the terminal for supplying an electric power thereto can be prevented from exposing to the space 61 thereby from exposing to the interior of the semiconductor producing apparatus.

In the embodiments shown in FIGS. 4–8, the mesh electrode which is the high frequency electrode may be a punched metal or non-woven fabric. Also, an electrostatic chuck electrode or a heat-generating resistive member as shown in FIG. 9 may be embedded in the substrate instead of the high frequency electrode.

DESCRIPTION OF PREFERRED EMBODIMENTS

Herein after, the present invention will be explained in more detail with reference to Preparation Examples.

Preparation Example 1

Joined bodies were prepared according to the method shown in FIG. 2. As the first and second members, respectively a plate-shaped aluminum nitride ceramics member was prepared having a size of 8 mm×40 mm×20 mm. In the Preparation Examples 1-1–1-4 shown in the following Table 1, a surface 50a of the respective member was plated by contacting with a nickel plating solution for a determined time. A brazing material sheet 53 having a ratio of components as shown in Table 1 was sandwiched between the two members to prepare an assembled body to be treated. The assembled body was put in an electric furnace and heated to a temperature of not less than the melting point of the brazing material and then cooled to room temperature to prepare a respective joined body. The sheet 53 had a size of 8 mm×40 mm×0.12 mm. When effecting the heating, a pressure of 70 g/cm$^2$ was applied to the sheet in the vertical direction. In comparative Examples 1-1, 1-2, the surface treating of the respective member was not performed.

A test piece for four points bending strength test was cut off from the respective joined body and measured for four points bending strength according to the method of JIS Z2204. Also, the respective joined body was exposed to a CF$_4$ plasma at 400° C. for 192 hrs. and the exposed joined body was measured for four points bending strength in the same manner as described above. Also, discoloration of the joined interface of the respective joined body was examined and a length of the discolored portion from the surface was measured considering the discolored portion as an invaded portion. The length of the discolored portion was expressed as the invaded distance.

TABLE 1

| Preparation Example | Components Ratio in Brazing Material | Surface Treating | Initial Four Points Bending Strength, MPa | Four Points Bending Strength After Corrodec, MPa | Invasion Distance μm |
| --- | --- | --- | --- | --- | --- |
| Example 1-1 | Al—10Si—1.5Mg | Ni plating on the member surface for 5 min. | 288 | 250 | 150 |
| Example 1-2 | Al—10Si—1.5Mg | Ni plating on the member surface for 10 min. | 272 | 255 | 145 |
| Example 1-3 | Al—12Si—3Cu | Ni plating on the member surface for 10 min. | 270 | 250 | 145 |
| Example 1-4 | 99Al | Ni plating on the member surface for 10 min. | 245 | 220 | 80 |
| Comparative Example 1-1 | Al—10Si—1.5Mg | Not treated | 110 | 65 | 200 |
| Comparative Example 1-2 | Ag—35Cu—2.25Ti | Not treated | 270 | 0 | >1500 |

As shown in Table 1, a joined body having a high four points bending strength and a high corrosion resistant property to halogen series corrosive gases and the like corrosive gases can be provided according to the present invention, and the joining can be performed easily by means of a brazing material made of various aluminum alloy or pure aluminum.

Meanwhile, the joined body of Comparative Example 1-1 had a relatively work joining strength and an inferior corrosion resistant property. This is considered presumably due to a low wettability of the brazing material to aluminum nitride. In Comparative Example 1-2, a method was adopted of largely increasing the content of the active metal in the brazing material to improve the wettability of the brazing material to aluminum nitride. As a result, the thus obtained joined body had a large initial joining strength, however, corrosion of the joined body was extremely progressed when exposed to a corrosive gas.

Figure 10:
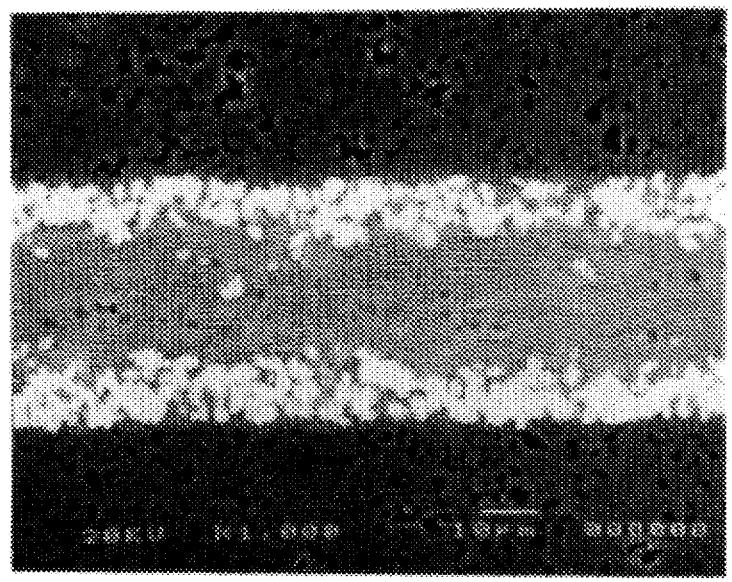
FIG. 10 is a photograph taken by a survey type electron microscope showing a ceramics texture of a joining interface of a joined body corresponding to FIG. 3A.

A photograph of the joining interface of the joined body of Preparation Example 1-1 was taken by a survey type electron microscope as shown in FIG. 10. As seen from FIG. 10, along the interfaces of the both sides of the joining layer made of the brazing material, particles of another substance were formed in rows. The respective portion of the joining layer was elementary analyzed by EDAX to find dispersed layers made of an aluminum-nickel intermetallic compound of a composition of $Al_3Ni$ remaining on the both sides of the layer made of the brazing material.

Preparation Example 2

Joined bodies were prepared according to the method shown in FIG. 1. Namely, two sheets of first member made of aluminum nitride were prepared, and a sheet of second member made of a metal was prepared. The sheet of the first member was sandwiched and joined between the two sheets of the second member. The material of the second member was varied as shown in the following Table 2. The size of the first member was 8 mm×40 mm×20 mm, and the size of the second member was 8 mm×40 mm×2 mm.

In the Preparation Examples 2-1–2-7 shown in Table 2, a surface 50a of the first member 50 was contacted with a nickel plating solution for a determined time to perform a nickel plating. A brazing material sheet 53 having a ratio of components as shown in Table 2 was sandwiched between the first and second members 50, 51 to prepare an assembled body to be treated. The assembled body was put in an electric furnace and heated to a temperature of not less than the melting point of the brazing material and then cooled to room temperature to prepare a respective joined body. The sheet 53 had a size of 8 mm×40 mm×0.12 mm. When the heating is effected, a pressure of 70 g/cm² was applied to the sheet in the vertical direction. In Comparative Examples 2-1–2-4, the surface treating of the respective member was not performed.

A test piece for four points bending strength test was cut off from the respective joined body and measured for four points bending strength according to the method of JIS Z2204.

TABLE 2

| Preparation Example | Components Ratio in Brazing Material | Surface Treating | Kind of Second Member | Four Points Bending strength MPa |
| --- | --- | --- | --- | --- |
| Example 2-1 | Al—10Si—1.5Mg | Ni plating on the member surface for 10 min. | Ni | 200 |
| Example 2-2 | Al—10Si—1.5Mg | Ni plating on the member surface for 10 min. | Al | 212 |
| Example 2-3 | Al—10Si—1.5Mg | Ni plating on the member surface for 10 min. | Co | 195 |
| Example 2-4 | Al—10Si—1.5Mg | Ni plating on the member surface for 10 min. | Mo | 180 |
| Example 2-5 | Al—10Si—1.5Mg | Ni plating on the member surface for 10 min. | Kovar | 205 |

TABLE 2-continued

| Preparation Example | Components Ratio in Brazing Material | Surface Treating | Kind of Second Member | Four Points Bending strength MPa |
|---|---|---|---|---|
| Example 2-6 | Al—12Si—3Cu | Ni plating on the member surface for 10 min. | Ni | 195 |
| Example 2-7 | 99Al | Ni plating on the member surface for 10 min. | Ni | 190 |
| Comparative Example 2-1 | Al—10Si—1.5Mg | Not treated | Ni | 95 |
| Comparative Example 2-2 | Al—10Si—1.5Mg | Not treated | Mo | 80 |
| Comparative Example 2-3 | Ag—25Cu—2.25Ti | Not treated | Ni | 120 |
| Comparative Example 2-4 | Cu—2.25Ti | Not treated | Ni | 90 |

As seen from Table 2, a joined body having a high four points bending strength can be provided according to the present invention, and the joining can be performed easily by means of a brazing material made of various aluminum nitride alloy or pure aluminum. A high joining strength was obtained also when either of nickel, molybdenum, copper, Kovar or aluminum was used as the material of the second member.

Meanwhile, the joined bodies of Comparative Examples 2-1, 2-2 had a relatively weak joining strength. This is considered presumably due to a low wettability of the brazing material to aluminum nitride. In Comparative Example 2-3, a method was adopted of largely increasing the content of the active metal in the brazing material to improve the wettability of the brazing material to aluminum nitride. However, in such a case, the temperature required for the joining was 600°–670° C. for Al series brazing materials, whereas it was 850° C. for the Comparative Example 2-3, and 1,050° C. for the Comparative Example 2-4, so that the joining strength of the Comparative Examples 2-3, 2-4 were low for the sake of remarkable thermal stress caused by difference of thermal expansion between the first member which is a ceramics and the second member which is a metal.

Figure 11:
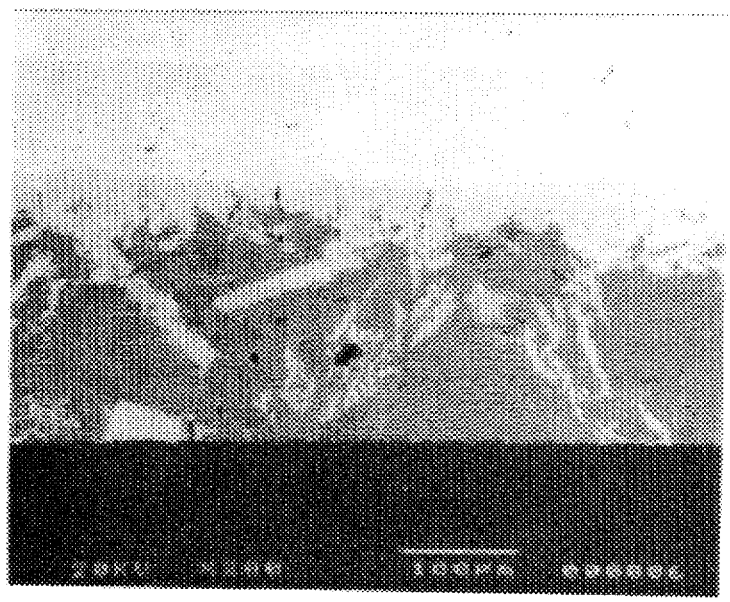
FIG. 11 is a photograph taken by a survey tape electron microscope showing a ceramics texture of a joining interface of a joined body corresponding to FIG. 3B.

A photograph of the joining interface of the joined body of Preparation Example 2-1 was taken by a survey type electron microscope as shown in FIG. 11. As seen from FIG. 11, particles of another substance were existing at everywhere in the joining layer made of the brazing material. Therefore, the respective portion of the joining layer was elementary analyzed by EDAX to find a large number of aluminum-nickel intermetallic compound particles of a composition of $Al_3Ni$ were formed in the continuous layer of the brazing material.

A continuous phase of a nickel-aluminum inter-metallic compound was found extending in a layer fashion along the interface between the joining layer and the nickel member. Among the continuous phase, $Al_3Ni$ was mainly formed in the region remote from the nickel member and $Al_3Ni_2$ was mainly formed in the region near the nickel member.

As described above, according to the present invention, a novel method of joining a ceramics containing aluminum to another member made of a metal or a ceramics whereby the joining of the ceramics containing aluminum to the another member can be facilitated and the joining strength can be improved. Therefore, the joined body according to the present invention can be satisfactorily applied to ceramic heaters, electrostatic chucks, susceptors having high frequency electrodes as well as to various semiconductor producing apparatuses and semiconductor devices.

Although the present invention has been explained with specific examples and numeral values, it is of course apparent to those skilled in the art that various changes and modifications thereof are possible without departing from the broad spirit and aspect of the present invention as defined in the appended claims.

What is claimed is:

1. A method of joining ceramics, including joining a ceramic first member made of aluminum nitride and a second member made of a ceramics or a metal, forming a metal film on a surface to be joined of the first member such that the metal film contacts directly with the surface to be joined of the first member, interposing a metallic joining material made of a different material from the metal film between the metal film and the second member, and heating at least the metallic joining material and the metal film in the state that the metallic joining material intervenes between the metal film and the second member thereby to join the first member and the second member.

2. The method of joining ceramics of claim 1, wherein the metal film is a nickel film.

3. The method of joining ceramics of claim 1, wherein the metallic joining material is selected from the group consisting of pure aluminum metal and aluminum series alloys.

4. The method of joining ceramics of claim 2, wherein the metallic joining material is selected from the group consisting of pure aluminum metal and aluminum series alloys.

* * * * *